United States Patent [19]

Pack, Jr. et al.

[11] Patent Number: 5,207,450
[45] Date of Patent: May 4, 1993

[54] ASPIRATED AIR CUSHION RESTRAINT SYSTEM

[75] Inventors: Wesley D. Pack, Jr., Clarkston; Richard J. Achtenberg, Williamston; Michael E. Wysocki, Warren, all of Mich.

[73] Assignee: Takata, Inc., Auburn Hills, Mich.

[21] Appl. No.: 806,037

[22] Filed: Dec. 12, 1991

[51] Int. Cl.$^5$ .............................................. B60R 21/30
[52] U.S. Cl. ..................................... 280/738; 280/731
[58] Field of Search ........................ 280/731, 732, 738

[56] References Cited

U.S. PATENT DOCUMENTS

| | | | |
|---|---|---|---|
| Re. 29,228 | 5/1977 | Hass | 280/738 |
| 3,056,540 | 10/1962 | Marsh et al. | 417/185 |
| 3,624,810 | 11/1971 | Hass | 280/738 |
| 3,632,133 | 1/1972 | Hass | 280/738 |
| 3,773,351 | 11/1973 | Catanzarite | 280/738 |
| 3,791,669 | 2/1974 | Hamilton | 280/738 |
| 3,801,127 | 4/1974 | Katter et al. | 280/738 |
| 3,840,246 | 10/1974 | McCullough, Jr. et al. | 280/738 |
| 3,843,152 | 10/1974 | Nonaka | 280/731 |
| 3,888,505 | 6/1975 | Shibamoto | 280/738 |
| 3,907,328 | 9/1975 | Werman | 280/742 |
| 3,909,037 | 9/1975 | Stewart | 280/738 |
| 3,910,595 | 10/1975 | Katter et al. | 280/732 |
| 3,938,826 | 2/1976 | Giorgini et al. | 280/738 |
| 3,994,506 | 11/1976 | Weman | 280/738 |
| 4,043,572 | 8/1977 | Hattori et al. | 280/738 |
| 4,500,114 | 2/1985 | Grey, Jr. | 280/742 |
| 4,833,996 | 5/1989 | Hayashi et al. | 102/530 |
| 4,877,264 | 10/1989 | Cuevas | 280/731 |
| 5,004,586 | 3/1991 | Hayashi et al. | 422/164 |
| 5,064,218 | 11/1991 | Hartmeyer | 280/731 |

*Primary Examiner*—Kenneth R. Rice
*Attorney, Agent, or Firm*—Harness, Dickey & Pierce

[57] ABSTRACT

An air cushion restraint system (ACRS) particularly adapted for a driver's-side motor vehicle applications. The ACRS incorporates a conventional inflator mounted to a base plate defining aspiration apertures which allow ambient air to supplement inflation gases generated by the inflator during air bag deployment.

11 Claims, 3 Drawing Sheets

ASPIRATED AIR CUSHION RESTRAINT SYSTEM

BACKGROUND AND SUMMARY OF THE INVENTION

This invention is related to a motor vehicle occupant protection system, and in particular, to an air cushion restraint system design for providing crash protection for the vehicle driver.

Air cushion restraint systems (ACRS) are in widespread use in modern motor vehicles These systems comprise a fabric air bag which is folded and mounted to the steering wheel hub or to some other part of the instrument panel of the vehicle. In the event of a serious vehicle impact, deceleration sensors cause an inflator to generate a non-combustible inflation gas which fills the air bag and causes it to be deployed. Upon inflation, the folded air bag is ejected from the steering wheel or instrument panel in front of the vehicle occupant and acts as a restraint for absorbing impact energy acting on the occupant, thus restraining the occupant from high acceleration contact with surfaces of the vehicle interior compartment.

Conventional ACRS use an inflator having a propellant which generates all of the inflation gas for deploying the air bag. The inflator and its propellant charge must be adequate to ensure generation of a sufficient volume of gas to fully inflate the air bag. More recent ACRS designs incorporate an aspiration feature in which ambient air is allowed to enter the air bag during inflation to supplement the gas volume generated by the inflator. This principle operates since, upon inflation, a high velocity jet of gas escapes from the inflator. This jet of gas forces the air bag to inflate explosively which generates localized low pressure areas within the air bag. By providing flow paths exposing these low pressure areas to ambient air, the total gas volume of the deployed air bag can be comprised of the combination of gases generated by the inflator and aspirated ambient air. Such aspirated systems have a number of advantages. By mixing ambient air with the hot gases generated by the inflator, the average temperature of the gases within the air bag is reduced. This temperature reduction is important since, upon deflation of the air bag, hot exhausted gases pose the hazard of injuring the vehicle occupant. Moreover, since a reduced quantity of propellant is needed, the inflator itself can also be reduced in size, providing advantages of packaging, cost, and weight.

Although aspirated ACRS designs are presently known, they typically require a specific inflator unit design in order to operate effectively. Moreover, such systems are not readily adapted for various applications in which the air bag internal volume is varied or the frontal crash characteristics or "pulse" of the vehicle require different inflation rates or pressures. In addition, typical aspirated ACRS designs require a number of specific hardware components which require special packaging, and can be bulky and expensive to produce.

The ACRS of the present invention is particularly adapted for use for the driver's position of a motor vehicle and is intended to be mounted to the vehicle steering column. The ACRS of this invention uses available off-the-self inflators which are mounted to a special base plate which together provide for aspiration enhanced inflation while minimizing special parts and packaging problems In fact, the structure is sufficiently compact and efficient to enable packaging in existing steering wheel ACRS environments virtually without rework. The ACRS of this invention is easily adapted or "tuned" for differing applications since the position and total area of the aspiration air inlets can be easily modified without reworking the inflator.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
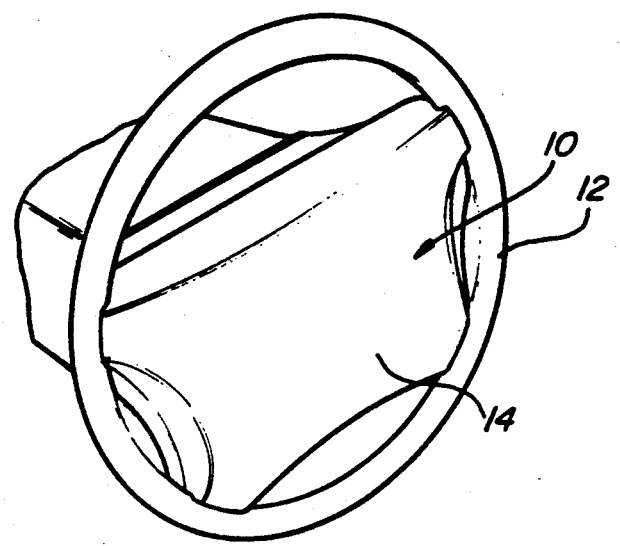
FIG. 1 is a pictorial view of a steering wheel assembly of a motor vehicle incorporating an ACRS in accordance with this invention.

An ACRS in accordance with this invention is generally designated by reference number 10 and is shown from various perspectives in the Figures. In FIG. 1, ACRS 10 is shown as a completed assembly mounted within steering wheel 12 which is typical for driver side ACRS applications. The significant elements comprising ACRS 10 are shown in each of the remaining Figures.

Cover 14 is of conventional construction being made from an elastomeric material such as vinyl which encloses the remaining ACRS components. As shown in the Figures, cover 14 has a double layer configuration. Preferably cover 14 is internally scored to define a tear line which fails upon inflation of the ACRS in a predetermine manner. As practiced in the industry, such tear lines are provided by forming the cover material to be thin along the tear lines.

Air bag 16 is enclosed within cover 14 and may be of various constructions, including the conventional design made from a woven nylon material which may have a coating of neoprene in order to control gas permeation after deployment. Air bag 16 defines a mounting opening 18 which allows the air bag to be mounted to vehicle support structure, as will be described in more detail. As is well known in the art, it is necessary to provide air bag 16 either with a permeable fabric or vent apertures as a means of allowing the inflation gases to be exhausted after deployment. Such exhaustion aids in energy dissipation and allows the bag to collapse to restore the occupant's visibility.

Inflator 22 is of conventional construction for driver-side applications and has a disk shape, defining mounting flange 24 with holes 25 around its perimeter with gas-impermeable reaction plate 26 on one side of mounting flange, whereas on the opposite side, the inflator defines inflation gas vent openings 28. As shown, vent openings 28 include a screen cover material 30 which aids in controlling the discharge of gas during inflation and contains the material within the inflator. As shown in the Figures, vent openings 28 allow gas to flow both radially from the side of the inflator and axially toward the center of air bag 16. Passing through reaction plate 26 is inflation signal cable 32 through which electrical deployment signals are sent. Signal cable 32 would be connected to an ACRS controller (not shown) which receives inputs from one or more crash sensors located at various location on the vehicle.

Figure 2:
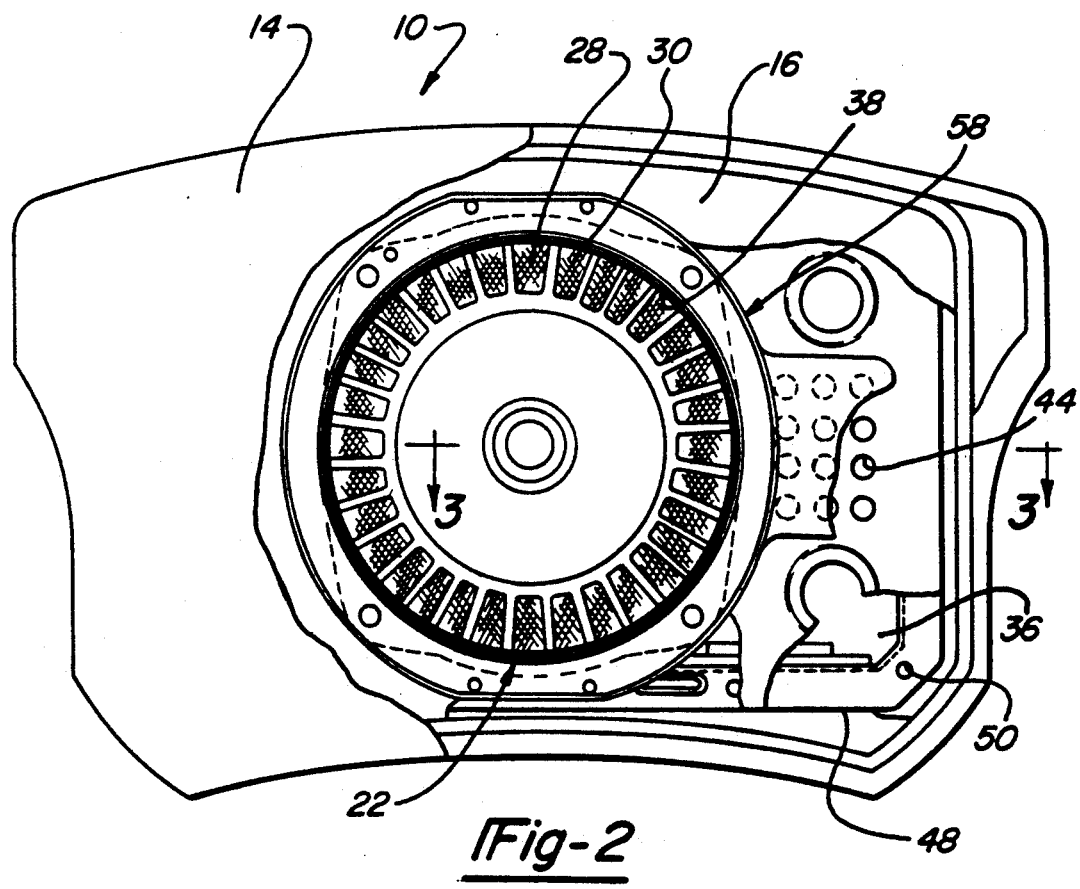
FIG. 2 is a frontal view of the ACRS shown in FIG. 1 showing various elements partially cut away to illustrate the internal elements of the system.

Base plate 36 is generally planer and has a central inflator aperture 38 surrounded by a series of inflator mounting holes 39. Base plate 36 also has a series of projecting mounting lugs 40 which are internally threaded to receive threaded mounting fasteners (not shown) for mounting the unit to the steering column. Base plate 36 also forms a number of holes 42 located around its periphery which are used for fastening air bag 16 to the base plate, as will be explained below. As best shown in FIG. 2, base plate 36 also forms a series of aspiration apertures 44 which are located on both lateral sides of the base plate and between mounting lugs 40. Although FIG. 2 shows twelve round apertures 44, other aperture configurations having different areas and/or shapes could also be provided.

Figure 3:
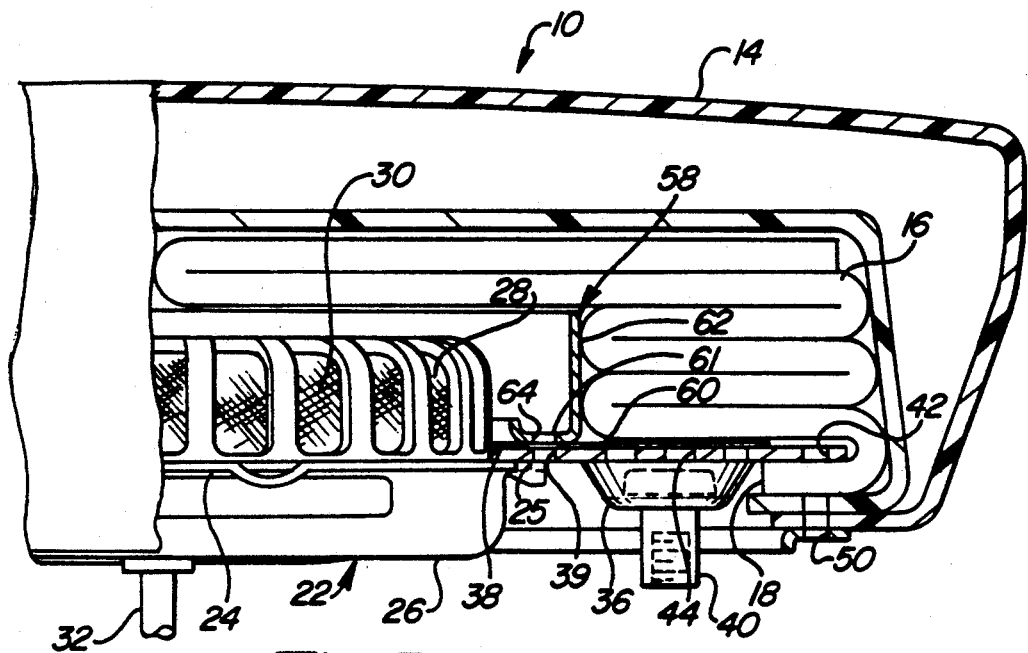
FIG. 3 is a cross-sectional view taken along line 3—3 of FIG. 2 showing the internal components of the ACRS of this invention in a normal non-deployed condition.
Figure 4:
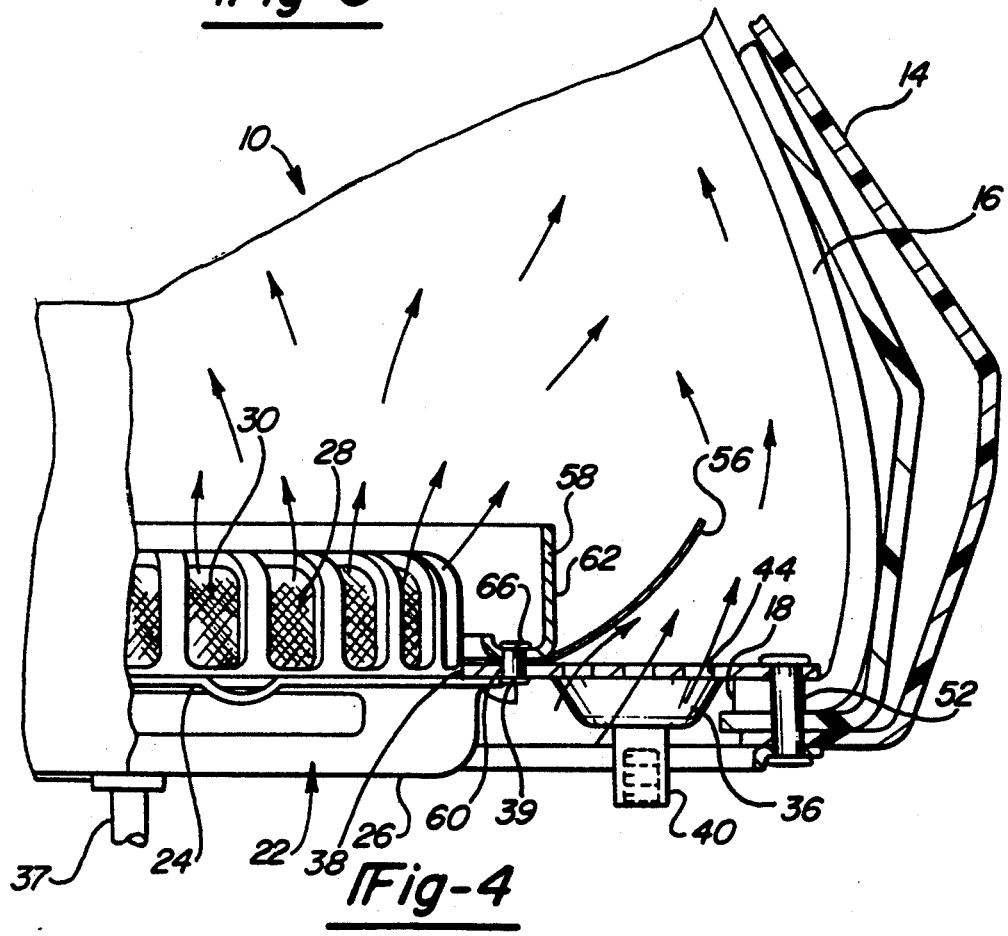
FIG. 4 is a cross-sectional view similar to FIG. 3 except showing the system in a deployed condition in which the air bag is undergoing inflation.
Figure 5:
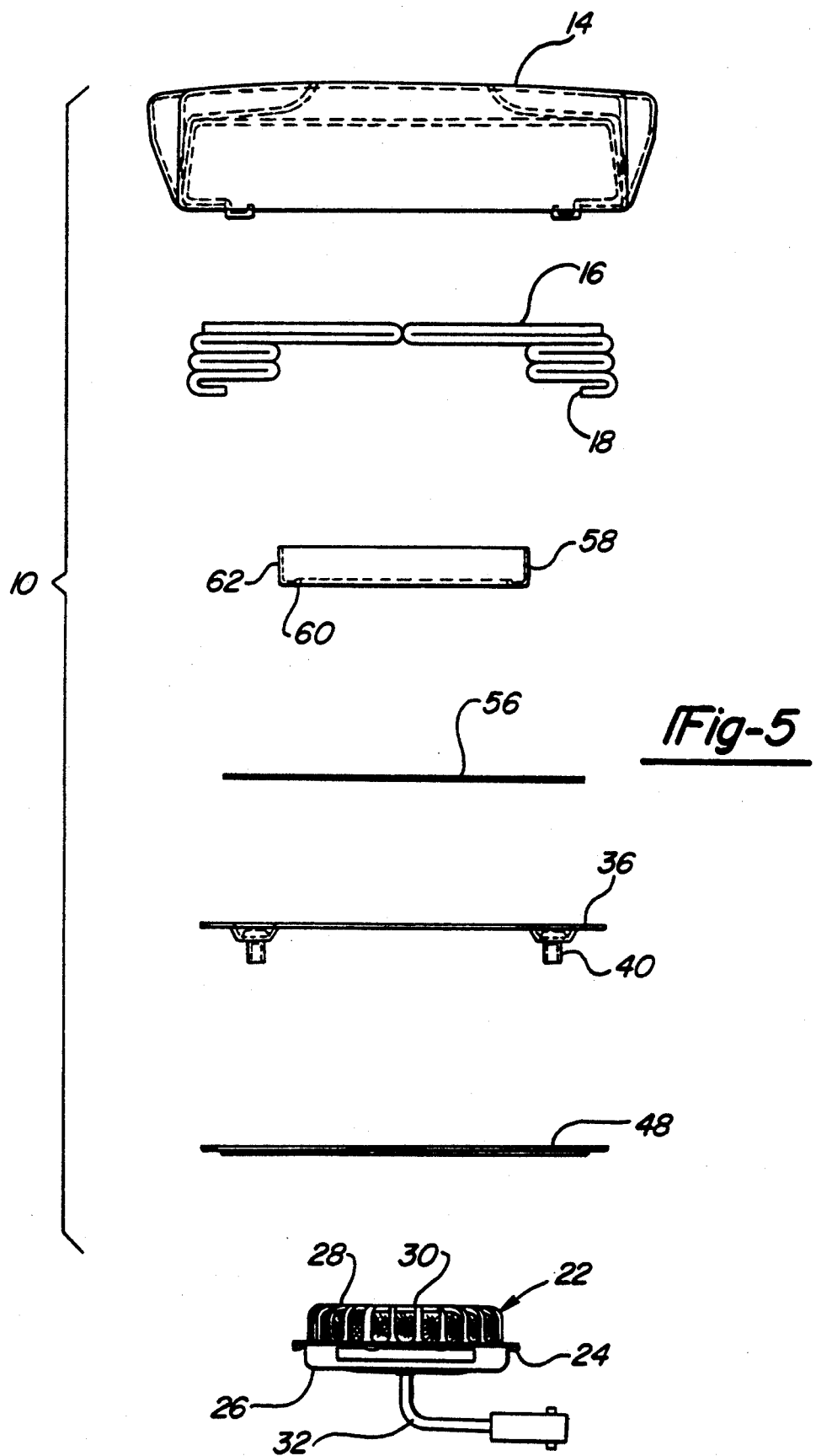
FIG. 5 is an exploded pictorial view of the principle elements comprising the ACRS of this invention.

Retainer pad 48 is a generally rectangular frame having a perimeter shape matching the perimeter of base plate 36. Retainer pad 48 is provided for attaching air bag 16 around mounting opening 18 to base plate 36. As best shown in FIGS. 3 and 4, retainer pad 48 also affixes cover 14 to base plate 36. Cover 14 and air bag 16 become pinched between base plate 36 and retainer pad 48 through the use of a number of fasteners such as threaded fasteners or rivets 52 which are placed through a series of retainer pad holes 50 which are in registry with base plate holes 42.

Aspiration flap 56 is a thin elastic membrane made, for example, of neoprene rubber. Aspiration flap 56 is positioned on base plate 36 to overlie aspiration apertures 44. The function of aspiration flap 56 as will be better explained later is to permit the entrance of ambient air through aspiration apertures 44, but restricts outflow through the apertures. Aspiration flap 56 is an optional item which may not be used in some applications.

ACRS 10 further includes retaining ring 58 having a radial base 60 which surrounds inflator 22, and an upstanding cylindrical wall 62. In the embodiment shown, wall 62 is slightly "taller" than inflator 22 (i.e. extends further from base plate 36 than does the inflator). Base surface 60 has a number of holes 64 located around the perimeter of the retainer ring which are provided to receive fasteners such as rivets 66. Rivets 66 pass through and connect together retaining ring 58, base plate 36, and inflator mounting flange 24. As is shown, aspiration flap 56 (when used) is trapped between retaining ring 58 and base plate 36.

The operation of a ACRS will now be described with particular reference to FIGS. 3 and 4. FIG. 3 illustrates the cooperation and orientation of the various elements comprising ACRS 10 when it is in a normal nondeployed condition. As shown, air bag 16 is folded in a compact manner to minimize the packaging space which must be provided for the air bag.

FIG. 4 illustrates the components comprising ACRS 10 during deployment of the system. As is shown, inflation gases escape from gas vent openings 28 to fill the interior of air bag 16. The increase in pressure within air bag 16 causes it to rapidly expand which forces cover 14 to tear open. During inflation, retainer ring 58 acts as an aspiration enhancement device through the provision of upstanding wall 62. Wall 62 causes gases escaping from the inflator in a radial direction along base plate 36 to be redirected in an axial direction toward the inside of the air bag 16. By directing the inflator gases in this manner, a low pressure area is created around aspiration apertures 44. This low pressure region causes ambient air to enter air bag 16 through aspiration apertures 44. The resiliency of aspiration flap 56 causes it to be displaced away from apertures 44 as shown in FIG. 4, allowing the inward flow of ambient air.

During a deployment sequence, a short time after air bag 16 is inflated, the bag becomes fully inflated and gasses are then allowed to escape. The controlled exhaustion of inflation gases within air bag 16 is conventionally provided using vent apertures in the fabric making up air bag 16. During this process of venting, aspiration flap 56 covers aspiration apertures 44 due to an increase in pressure within air bag 16 causing the vent flow to be directed through the air bag vent apertures. In an alternate embodiment of this invention, aspiration flap 56 could be eliminated in which case the aspiration apertures 44 would also provide a vent path for the outward flow of inflation gases.

As is evident from this description of the invention, the structure of ACRS 10 is efficiently packaged thus enabling mounting to existing steering column support features. The various features of this invention are achieved principally through the implementation and design of base plate component 36. Base plate 36 combines multiple functions including: providing a mounting for air bag 16, enabling the ACRS 10 to be mounted to vehicle structure via mounting legs 40, providing a mounting for inflator 22, and further providing aspiration apertures 44. In comparing ACRS 10 to prior art designs of driver-side ACRS systems, it becomes apparent that the addition of the aspiration feature of this invention is provided with little change to existing non-aspirated drivers-side ACRS configurations.

While the above description constitutes the preferred embodiments of the present invention, it will be appreciated that the invention is susceptible of modification, variation and change without departing from the proper scope and fair meaning of the accompanying claims.

We claim:

1. An air cushion restraint system for a motor vehicle driver and mounted to the vehicle steering wheel comprising:
   an inflator for generating an inflation gas having a generally disk shaped configuration defining a perimeter mounting flange and having an inflation gas nozzle,
   an air bag formed from a flexible membrane and defining a mounting opening,
   a generally planar base plate having an inflator aperture for receiving said inflator, and said base plate having an outer perimeter generally outlining said air bag mounting opening, said base plate having at least one aspiration aperture through said base plate located on said base plate displaced from aid inflator aperture between said inflator aperture and said outer perimeter, said base plate further having means for mounting said base plate to said motor vehicle steering wheel, inflator mounting means engaging said base plate and said inflator mounting flange for affixing said inflator to said base plate whereby said inflator passes partially through said inflator aperture with a portion of said inflator on one side of said base plate and said inflator apertures on the opposite side of said base plate, and air bag attachment means for affixing said air bag mounting opening to said base plate.

2. An air cushion restraint system according to claim 1 further comprising an aspiration flap made of a flexible sheet and covering said aspiration aperture for allowing air to enter said air bag while restricting outward flow of gases within said air bag from exiting through said aspiration aperture.

3. An air cushion restraint system according to claim 1 further comprising an aspiration enhancement device in the form of a ring having an upstanding perimeter wall surrounding said inflator and extending generally perpendicular to said base plate with said wall between said inflator and said aspiration apertures.

4. An air cushion restraint system according to claim 3 wherein said aspiration enhancement ring perimeter wall extends from said base plate a distance exceeding that of said inflator.

5. An air cushion restraint system according to claim 1 wherein said air bag attachment means includes a retainer pad in the form of a frame affixed to said base plate using a plurality of fasteners arranged around said base plate perimeter with said air bag clamped between said base plate and said retainer pad.

6. An air cushion restraint system for a motor vehicle comprising:
   an inflator for generating an inflation gas having a generally disk shaped configuration defining a perimeter mounting flange with said inflator defining a gas impermeable reaction plate on one side of said mounting flange, while said inflator on the opposite side of said mounting flange defines inflation gas nozzles,
   an air bag formed from a flexible membrane and defining a mounting opening,
   a generally planar base plate having an inflator aperture for receiving said inflator, and having an outer perimeter generally outlining said air bag mounting opening, said base plate having at least one aspiration aperture through said base plate located on said base plate between said inflator aperture and said perimeter, said base plate further having means for mounting said base plate to said motor vehicle,
   inflator mounting means engaging said base plate and said inflator mounting flange for affixing said inflator to said base plate whereby said inflator is mounted to said inflator opening with said inflation gas nozzles on one side of said base plate and said reaction plate on the opposite side of said base plate,
   air bag attachment means for affixing said air bag mounting opening to said base plate, and
   an aspiration enhancement device in the form of a ring having an upstanding perimeter wall surrounding said inflator and extending generally perpendicular to said base plate with said wall positioned between said inflator and said aspiration apertures.

7. An air cushion restraint system according to claim 6 further comprising an aspiration flap made of a flexible sheet and covering said aspiration aperture for allowing air to enter said air bag while restricting outward flow of gases within said air bag from exiting through said aspiration aperture.

8. An air cushion restraint system according to claim 6 wherein said aspiration enhancement device perimeter wall extends from said base plate a distance exceeding that of said inflator.

9. An air cushion restraint system according to claim 6 wherein said air bag attachment means includes a retainer pad in the form of a frame affixed to said base plate using a plurality of fastener arranged around said base plate perimeter with said air bag clamped between said base plate and said retainer pad.

10. An air cushion restraint system for a motor vehicle driver comprising:
    an inflator for generating an inflation gas having a generally disk shaped configuration defining a perimeter mounting flange,
    an air bag formed from a flexible membrane and defining a mounting opening,
    a generally planar base plate having an inflator aperture for receiving said inflator, and having an outer perimeter generally outlining said air bag mounting opening, said base plate having at least one aspiration aperture through said base plate located on said base plate between said inflator aperture and said outer perimeter, said base plate further having means for mounting said base plate to said motor vehicle,
    inflator mounting means engaging said base plate and said inflator mounting flange for affixing said inflator to said base plate whereby said inflator is mounted to said inflator aperture,
    air bag attachment means for affixing said air bag mounting opening to said base plate, and
    an aspiration enhancement device in the form of a ring having an upstanding perimeter wall surrounding said inflator and extending generally perpendicular to said base plate with said wall between said inflator and said aspiration apertures.

11. An air cushion restraint system according to claim 10 wherein said aspiration enhancement ring perimeter wall extends from said base plate a distance exceeding that of said inflator.

* * * * *

UNITED STATES PATENT AND TRADEMARK OFFICE
CERTIFICATE OF CORRECTION

PATENT NO. : 5,207,450
DATED : May 4, 1993
INVENTOR(S) : Wesley D. Pack et al.

It is certified that error appears in the above-identified patent and that said Letters Patent is hereby corrected as shown below:

Column 4, Line 64, Claim 1 after "from" delete "aid" and insert --said--

Column 5, Line 3, Claim 1 after "whereby said inflator" insert --is mounted in said inflator aperture, such that said inflator--

Column 6, Line 46, Claim 10 after "mounted" delete "to" and insert --in--

Signed and Sealed this

Eighteenth Day of January, 1994

Attest:

BRUCE LEHMAN

Attesting Officer   Commissioner of Patents and Trademarks